United States Patent [19]

Sacher et al.

[11] Patent Number: 5,205,788

[45] Date of Patent: Apr. 27, 1993

[54] TORSIONAL SHOCK ABSORBER WITH CONSECUTIVE STEP-WISE ELASTIC RESISTANCE TO RELATIVE ROTATION

[75] Inventors: Christoph Sacher, Sauerlach/Arget; Johann Eichinger, Vaterstetten, both of Fed. Rep. of Germany

[73] Assignee: Hurth Getriebe und Zahnraeder G.m.b.H., Munich, Fed. Rep. of Germany

[21] Appl. No.: 521,269

[22] Filed: May 8, 1990

[30] Foreign Application Priority Data

May 12, 1989 [DE] Fed. Rep. of Germany ....... 3915527

[51] Int. Cl.⁵ .......................... F16D 3/16; F16D 3/12
[52] U.S. Cl. ......................................... 464/61; 464/85; 464/160
[58] Field of Search .................. 464/30, 33, 35, 36, 464/61, 83, 85, 93, 94, 160, 161, 17, 66, 68; 192/106.1

[56] References Cited

U.S. PATENT DOCUMENTS

| | | | |
|---|---|---|---|
| 2,504,750 | 4/1950 | Strachovsky | 464/93 |
| 3,567,010 | 3/1971 | Stein | 464/36 X |
| 3,893,553 | 7/1975 | Hansen | 464/36 X |
| 3,913,301 | 10/1975 | Keller et al. | 464/36 X |
| 4,591,348 | 5/1986 | Takeuchi et al. | 464/66 X |
| 4,693,354 | 9/1987 | Umeyama et al. | 464/85 X |
| 4,789,375 | 12/1988 | Bassett | 464/68 |
| 4,944,499 | 7/1990 | Tojima | 464/68 X |

FOREIGN PATENT DOCUMENTS

| | | | |
|---|---|---|---|
| 323578 | 12/1971 | U.S.S.R. | 464/35 |
| 485245 | 9/1975 | U.S.S.R. | 464/35 |
| 575440 | 10/1977 | U.S.S.R. | 464/35 |

Primary Examiner—Daniel P. Stodola
Assistant Examiner—Tony A. Gayoso
Attorney, Agent, or Firm—Flynn, Thiel, Boutell & Tanis

[57] ABSTRACT

A torsion attenuator for boat transmissions including a primary part coupled with the flywheel of a motor, a secondary part coupled with the input shaft of a reversing gear, which secondary part can be rotated relative to the primary part, plural elastic elements acting in a direction opposite the direction of the relative rotation and arranged symmetrically with respect to the axis of rotation between the primary part and the secondary part. At least one friction element is also provided for inhibiting the relative rotation and arranged between the primary part and the secondary part. In order to make possible a large relative rotation between the primary and secondary parts and with the elastic elements being of a specific given length, it is provided that the elastic elements on the primary part and/or on the secondary part and the structure associated therewith are supported on a sloped plane active in peripheral direction.

8 Claims, 2 Drawing Sheets

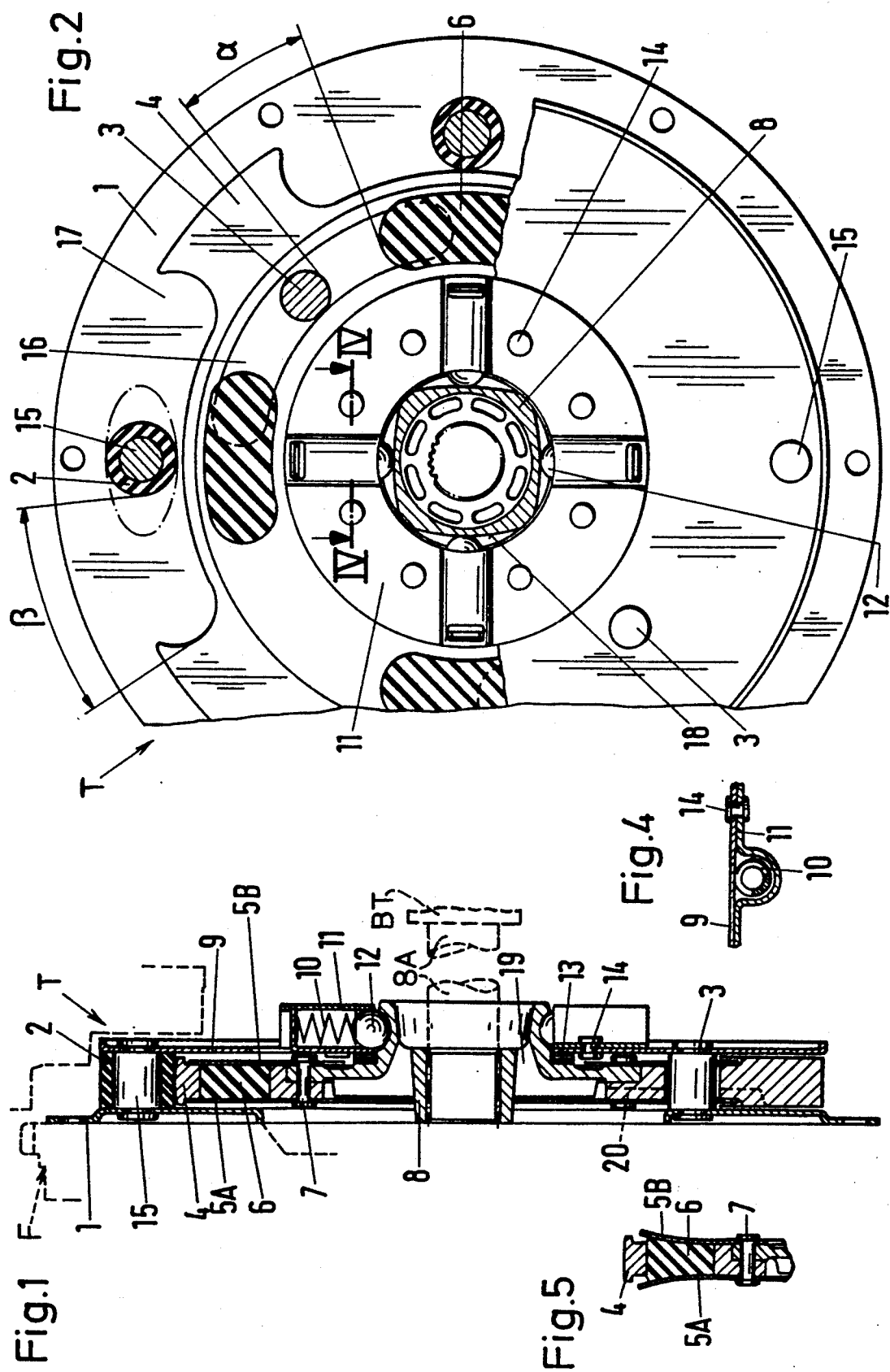

TORSIONAL SHOCK ABSORBER WITH CONSECUTIVE STEP-WISE ELASTIC RESISTANCE TO RELATIVE ROTATION

FIELD OF THE INVENTION

The invention relates to a torsion shock absorber or damper for a boat transmission including a primary part coupled with the flywheel of a motor, a secondary part coupled with the input shaft of a reversing gear, which secondary part can be rotated relatively to the primary part, plural elastic elements acting oppositely to the relative rotation and arranged symmetrically with respect to the axis of rotation between the primary part and the secondary part and at least one friction element inhibiting the relative rotation and arranged between the primary part and the secondary part.

BACKGROUND OF THE INVENTION

Interfering rattling noises occur in a boat transmission particularly when the boat travels forward or backward during a low idling speed of the motor. The reason for these rattling noises are torsional vibrations of the motor on the one hand and low propeller torques on the other hand. Because of the reduced distorting of the gears, a chattering of the tooth flanks takes place. Such torsional vibrations are in addition enhanced by the fact that, due to engine-specific viewpoints, the inertia moment of the flywheel is more and more reduced. To reduce such torsional vibrations, torsion shock absorbers are utilized.

However, there are cases in practice in which common torsion shock absorbers are not sufficient in curing the problem of torsional vibrations. The reasons for this are among others:

the path of rotation is too small, in particular in the first step;

hard transition between the individual attenuation steps.

Furthermore two masses—flywheels with hydraulically damped vibration cancellation means—are known, which, however, are complicated and are too expensive for the here existing use.

In a torsion shock absorber of the above-mentioned type, which shock absorber is described in DE-34 90 360 C2 (corresponds to U.S. Pat. No. 4,650,053), the elastic elements formed by the helical springs act in tangential direction and the associated support surfaces of the primary part and of the secondary part are at a right angle with respect to the longitudinal axis of the helical springs. The relative rotation of the primary and secondary part is in such a torsion attenuator only small and is limited by the number and the length of the helical springs. The helical springs can only be compressed until their coils rest on one another. The possible relative rotation could only be increased by a correspondingly greater length of the helical springs which, however, is only possible to a limited degree.

SUMMARY OF THE INVENTION

The basic purpose of the invention is to provide an inexpensive torsion shock absorber of the type which, at a pregiven length of the elastic elements, enables a large relative rotation of the primary and secondary parts.

This purpose is attained according to the invention by supporting the elastic elements on a sloped plane active in peripheral direction of the primary part and/or the secondary part.

By supporting the elastic elements on a sloped plane, the rotary movement of the primary and/or secondary part can be substantially greater than the spring path of the elastic elements. The smaller the rise of the sloped plane, the greater is, at a specific spring path of the elastic elements, the possible relative rotation of the primary and secondary parts. The torsion shock absorber of the invention is therefore distinguished by a spring characteristic line having a small spring rate over a large range of relative rotation. A test has shown that in a boat transmission equipped with the torsion shock absorber of the invention, the rattling noises are substantially less than in a common torsion shock absorber. This advantageous characteristic is particularly noticeable when the boat travels forward or backward at a low idling speed.

Furthermore, it was found that such a low torsion stiffness, which in the driving line acts similar to a slack, has no negative effects on the driving behavior of a boat.

BRIEF DESCRIPTION OF THE DRAWINGS

Two exemplary embodiments of the invention are illustrated in the drawings and will be discussed in greater detail hereinafter.

In the drawings:

FIG. 1 is a cross-sectional view of a first embodiment of a torsion shock absorber of the invention for boat reversing gears;

FIG. 2 is a partially cross-sectioned front view of the torsion shock absorber according to FIG. 1;

FIG. 4 is a cross-sectional view taken along the line IV–IV of FIG. 2;

FIG. 5 illustrates a detail of FIG. 1 with the deformation of a rubber buffer being illustrated in an exaggerated scale;

DETAILED DESCRIPTION

Figure 3:
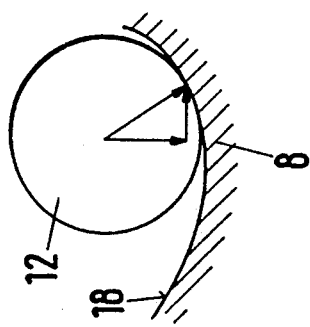
FIG. 3 illustrates a detail of FIG. 1 in an enlarged scale.

As can particularly be seen in FIG. 1, the torsion shock absorber T has a connecting plate 1 rigidly connected to the flywheel F of a motor, which flywheel is indicated by dash-dotted lines. The connecting plate 1 is rigidly connected to a cover plate 9 through two first bolts 3 and four second bolts 15 offset at 45° with respect to the two first bolts. A plate 4 is arranged between the connecting plate 1 and the cover plate 9, which plate 4 has two arcuate slots 16 receiving the first bolts 3 therein and, closer to the circumference, four recesses 17 receiving the second bolts 15 therein. An elastic rubber buffer 6 is inserted into the two end areas of each arcuate slot 16, while an elastic rubber sleeve 2 encircles each of the second bolts 15. The purpose of the rubber buffers 6 and of the rubber sleeves 2 will be discussed in greater detail hereinafter.

The plate 4 is rigidly connected by rivets 7 to a hub 8, which is press-fit onto the input shaft 8A of a boat reversing gear of a boat transmission BT. The rivets 7 are at the same time utilized for fastening of two spring washers 5A and 5B, resting on the two side surfaces of the rubber buffer 6, to the plate 4. A friction ring 13 is arranged between the hub 8 and the cover plate 9. A spring receiving structure 11 is rigidly connected to the cover plate 9 by rivets 14. The spring receiving structure 11 forms together with the cover plate 9 a mounting for four radially arranged helical springs 10. The radially inner end of each helical spring 10 is supported on a ball 12 and serves to keep each ball in engagement with one of four inclined tracks 18 constructed on the periphery of the hub 8.

According to FIG. 2, the four inclined tracks 18 consist of two symmetrically curved or convex surfaces forming inclined planes acting in peripheral direction, on which planes the balls 12 are supported.

FIGS. 1 and 3 show in particular that each inclined track 18 has a circular cross section, and the centerpoint of the associated ball 12 is slightly offset to the right (FIG. 3), namely, away from the friction ring 13, away from the curvature centerpoint of the inclined track 18. This has the result that the radial force applied by the helical spring 10 onto the ball 12 has an axial component loading the friction ring 13. The friction ring 13 is therefore at all times clamped between a flange of the hub 8 and the inner circumference of the cover plate 9.

The hub 8 and the plate 4 are provided with air channels 19 or 20, like an internally vented disk brake.

The connecting plate 1 and the parts rigidly connected thereto are usually identified as a primary part of the torsion shock absorber, while the hub 8 and the parts rigidly connected thereto are identified as a secondary part of the torsion shock absorber.

OPERATION

In the following discussion of the operation of the above-described torsion shock absorber T, it is assumed that the hub 8 coupled to the input shaft of a boat reversing gear of the boat transmission BT is stationary, while the connecting plate 1 connected to the flywheel F of an internal combustion engine carries out a rotary movement. During such a rotary movement, regardless in which direction, the four balls 12 run in the associated inclined track 18, which thereby functions like a radially outwardly extending sloped or convex plane and presses the ball 12 radially outwardly against the force of the associated spring 10. The four springs 10 are therefore increasingly compressed. This operation is identified as a first spring step.

During this relative movement of the connecting plate 1 relative to the hub 8 there also occurs a relative movement between the first and second bolts 3 and 15 fastened on the connecting plate 1, on the one hand, and the plate 4 fastened on the hub 8, on the other hand. After a relative rotation through an angle $\alpha$, each one of the first bolts 3 rests on one of the rubber buffers 6 located in the arcuate slots 16. Upon a further relative rotation of the connecting plate 1 relative to the hub 8 not only the four helical springs 10 are further compressed, but the two rubber buffers 6 are also deformed. Since the rubber buffers 6, however, are not compressed by the clamping action performed by the helical springs 10, a significantly steeper rise of the spring characteristic line results in this area identified as the second spring step.

When the connecting plate 1 is rotated still further altogether through an angle $\beta$ relative to the hub 8, then the four second bolts 15 and their respective rubber sleeves 2 will rest on the corresponding end of the recesses 17 of the plate 4. Since it is more difficult to deform the rubber sleeves 2 than the rubber buffers 6, a yet steeper rise of the spring characteristic line occurs during a further relative rotation identified as a third spring step.

FIG. 5 shows that the two spring plates 5A and 5B are pressed outwardly during a compression of the rubber buffers 6 thus causing friction between the plates 5A, 5B and the rubber buffers. This friction in connection with the actually already higher material attenuation (rubber) achieves altogether a high attenuation in the second step. The heat development can be held within reasonable limits through a proper directing of the cooling air.

Any person skilled in the art understands that the above-described torsion shock absorber can also be modified such that the inclined tracks 18 are arranged not on the hub 8 but on the cover plate 9 and the spring receiving structure 11 is ar not on the cover plate but on the hub 8. The centrifugal force acting onto the balls 12 would in this case not have any influence on the associated helical spring 10. The centrifugal force applied on the balls 12 is in this illustrated embodiment is transferred onto the associated helical spring 10. By suitably designing the helical spring 10, it is therefore possible that, at a specific speed, the centrifugal force of the ball 12 will cause the springs 10 to be compressed such that the first spring step is consumed and the two first bolts 3 will rest on the associated rubber buffer 6. Such an operating state is advantageous in view of a reduction of the wear of the balls 12 and of the inclined tracks 18.

Figure 6:
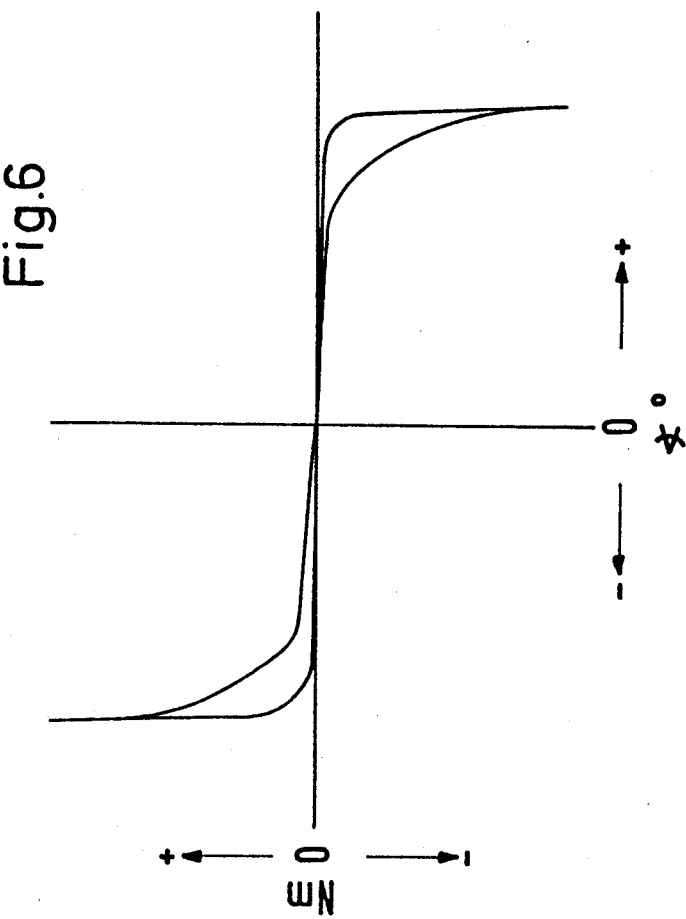
FIG. 6 illustrates the spring characteristic line achievable with the torsion shock absorber of the invention.

FIG. 6 shows the spring characteristic line of the torsion shock absorber, which line is identified as a so-called hysteresis loop. The spring characteristic line is very flat in the first spring step, in which alone the four helical springs 10 are compressed. Since the compression of the helical springs 10 occurs according to the principle of the sloped plane, this first spring step extends over a considerable angle of rotation, which in the illustrated exemplary embodiment amounts to approximately $\pm 15°$. The second spring step determined by the compression of the rubber buffers 6 extends over an angle of rotation of 15° to 30°. The spring characteristic line rises suddenly in the third spring step because the rubber sleeves 2 are hardly deformable.

Any person skilled in the art can recognize that the course of the spring characteristic line in the second and third spring step can be influenced both by the material and also by the cross section of the rubber buffer 6 or rather of the rubber sleeve 2. An example of this, in reference to the sleeve 2, is indicated by dash-dotted lines in FIG. 2.

Figure 7:
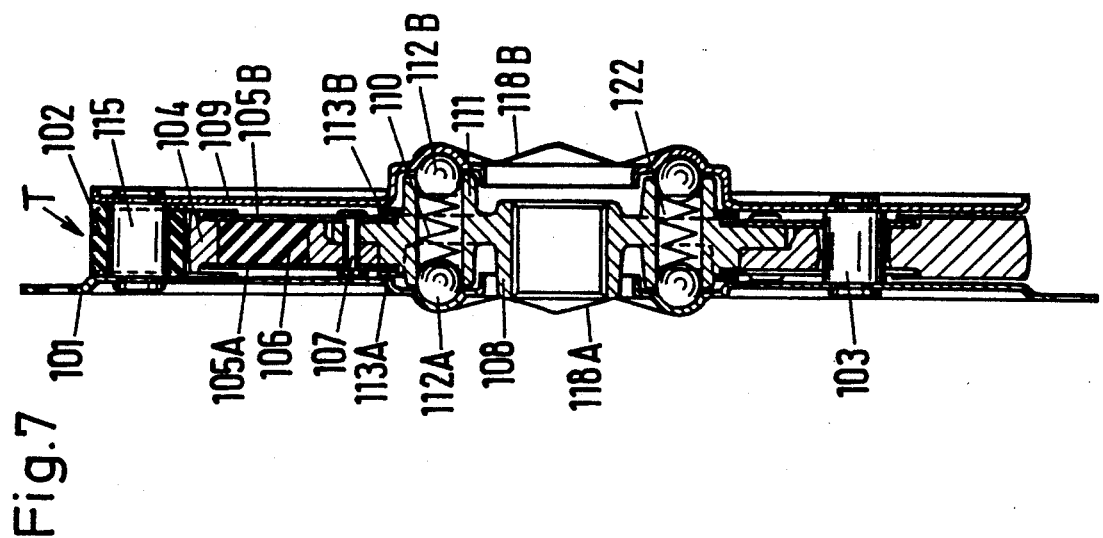
FIG. 7 is a cross-sectional view of a second embodiment of a torsion shock absorber of the invention.

The modified embodiment of a torsion shock absorber shown in FIG. 7 identifies those structural parts corresponding with the embodiment according to FIGS. 1 to 5 with the same reference numerals, but with the addition of the number 100. The important difference between the embodiment shown in FIG. 7 and the embodiment shown in the preceding figures is that the helical springs 110 are axially arranged. Four axial bores 122 are constructed in the hub 108, with one helical spring 110 being arranged in each of the bores. Two balls 112A, 112B are associated with each of the helical springs 110, which balls roll along in corresponding inclined tracks 118A, 118B constructed in the connecting plate 101 and in the cover plate 109 and extending in peripheral direction. The inclined tracks 118A and 118B act as sloped planes in peripheral direction so that the springs 110 are compressed when the balls 112A, 112B, during a rotation of the connecting plate 101 relative to the cover plate 109, roll along in the ramp-like inclined tracks 118A, 118B. Altogether four inclined tracks 118A and 118B are provided, each of which has two sections oppositely inclined with respect to each other and extending over 45°.

Since the operation of the rubber buffers 106 and of the rubber sleeves 102 in the second and third spring steps basically correspond with the exemplary embodiment described in connection with FIGS. 1 to 6, reference is made to that corresponding operation discussion.

When reference is made above to rubber buffers and rubber sleeves, it is assumed that these are in general elastic materials.

The torsion shock absorber of the invention can be successfully utilized also in those cases where a large angle of relative rotation between the flywheel of the motor and the aggregate coupled thereto is desired.

The embodiments of the invention in which an exclusive property or privilege is claimed are defined as follows:

1. A torsional shock absorber, comprising:
  a primary part adapted to be coupled with a rotatable flywheel of a motor and rotated therewith;
  a secondary part adapted to be coupled with a rotatable input shaft of a boat transmission, said secondary part being rotatable relative to said primary part only through a limited angle;
  compressible first and second resilient means for resisting said relative rotation of said primary part and said secondary part and mounting means for orienting said first and second resilient means symmetrically with respect to an axis of rotation of said primary part and said secondary part;
  first means for effecting said second resilient means becoming active only after said first resilient means has become active, said second resilient means having a greater hardness and, therefore, requiring a greater force to compress it than for said first resilient means;
  at least one friction element arranged between said primary part and said secondary part for hindering said relative rotation; and
  said first resilient means including bearing means directly, relatively movably, supported on at least one inclined surface extending in a peripheral direction, said surface being provided on at least one of said primary part and said secondary part so that said bearing means will move along said inclined surface to increasingly compress said first resilient means in response to increasing relative rotation between said primary part and said secondary part to increasingly resist said relative rotation, said second resilient means also defining a limit and thereby a finite size for said limited angle, said second resilient means thereby preventing further relative rotation between said primary part and said secondary part beyond said limited angle.

2. The torsional shock absorber according to claim 1, wherein said first resilient means includes plural helical springs and said bearing means supported on said inclined surface includes plural balls resting on a respective inclined surface.

3. The torsional shock absorber according to claim 2, wherein said first resilient means has a spring force, when compressed, acting in a direction perpendicular to said axis of rotation of said primary part and said secondary part.

4. The torsional shock absorber according to claim 2, wherein said first resilient means has a spring force, when compressed, acting in a direction parallel with respect to said axis of rotation of said primary part and said secondary part.

5. The torsional shock absorber according to claim 1, wherein plural inclined surfaces are provided and are, in addition, inclined in an axial direction, wherein said bearing means are supported on said inclined surfaces to apply a supporting force onto said bearing means to cause said bearing means to exert an axial force component onto said friction element in response to rotation of said primary part to further hinder said relative rotation between said primary part and said secondary part.

6. The torsional shock absorber according to claim 5, wherein said second resilient means includes a second elastically yieldable member and a third elastically yieldable member arranged between said primary part and said secondary part, wherein a second means is provided for effecting said third elastically yieldable member becoming compressed only after said second elastically yieldable member has been compressed, said third elastically yieldable member having a greater hardness and, therefore, requiring a greater force to compress it than for said second elastically yieldable member.

7. The torsional shock absorber according to claim 6, wherein said second and third elastically yieldable members are both rubber buffers acting in said peripheral direction, which rubber buffers are held between elastically yieldable plates yieldable in a direction parallel to said axis of rotation.

8. The torsional shock absorber according to claim 7, including means for defining plural air channels in said primary part and said secondary part for cooling said rubber buffers.

* * * * *